July 22, 1924.
J. HOLL ET AL
PORTABLE ELECTRIC LAMP
Filed Aug. 14, 1922
1,502,338
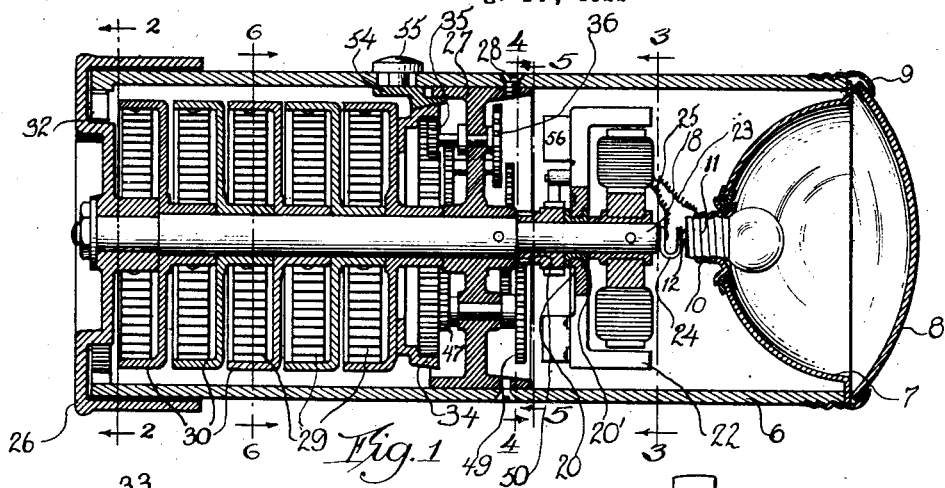

Patented July 22, 1924.

1,502,338

UNITED STATES PATENT OFFICE.

JOHN HOLL AND GALLUS E. BOETTCHER, OF RICHARDSON, NORTH DAKOTA.

PORTABLE ELECTRIC LAMP.

Application filed August 14, 1922. Serial No. 581,862.

*To all whom it may concern:*

Be it known that we, JOHN HOLL and GALLUS E. BOETTCHER, both citizens of the United States, and residents of Richardson, in the county of Stark and State of North Dakota, have invented certain new and useful Improvements in Portable Electric Lamps, of which the following is a full, clear, and exact description.

The invention relates to portable electric lamps and its object is to provide a lamp of this type in which a battery is dispensed with and which comprises mechanical means, such as a spring-motor, which may be manually wound, for operating a generator for a considerable period. By dispensing with a battery, the lamp may be used indefinitely, it being only necessary to periodically wind the motor.

The invention consists in the several novel features hereinafter set forth and more particularly defined by claims at the conclusion hereof.

In the drawings:

Fig. 1 is a longitudinal section of a lamp embodying the invention,

Fig. 2 is a section on line 2—2, Fig. 1,
Fig. 3 is a section on line 3—3, Fig. 1,
Fig. 4 is a section on line 4—4, Fig. 1,
Fig. 5 is a section on line 5—5, Fig. 1,
Fig. 6 is a section on line 6—6, Fig. 1.

The invention is exemplified in a lamp comprising a cylindrical casing 6, a reflector 7 at one end of the casing, a lens 8, a ring 9 screw-threaded to the same end of the casing and removably securing the reflector and the lens to the casing, a lamp-socket 10, secured in and insulated from the reflector, and an incandescent lamp 11 having its base in contact with and held in said socket and having a tip 12, all of which may be the usual construction, as well understood in the art.

Current to actuate the lamp is supplied thereto by an electric generator which comprises a rotary field 13 and a stationary armature 14. The latter has suitable serially connected windings 15 around a core comprising radial arms 16 and a hub 17, which has a bushing which is fixedly secured on a stationary shaft 18. The rotary field comprises a hub 20 having a bushing 20' which is loose on shaft 18 and arms 21 with integral longitudinally extending pole-pieces 22, which rotate around the ends of arms 16. While a generator of this type may be advantageously used, it will be understood that any suitable generator may be used. The armature windings are connected by a wire 23 to the lamp-socket and by a wire 25 to a spring-contact 24 adapted to engage the tip-contact 12 of the lamp, so that a constant circuit will be maintained which will cause the current generated to flow thru and actuate the lamp while the generator is operated.

A mechanical motor is provided in the casing to drive the generator thru multiplying gearing and the motor is adapted to be wound up by a cap 26 which closes the back end of case 6 and is rotatable relative thereto, being loosely held on shaft 18. A head 27 is fixedly secured in the case by screws 28. Shaft 18 is fixed in and supported by said head. The motor comprises a series of convolute springs 29 and intermediate drums 30 which are loosely mounted on shaft 18. Each spring has its inner end connected to the hub of one drum and its outer end to the outwardly extending annular flange of the next drum so that the springs will be serially connected and to cumulate their power. The hub to which the inner end of the first spring is connected is formed on the cap 26 so the springs may be wound up by rotation of the cap relatively to the case. A ratchet 31 is formed on the inner periphery of the rear end of the case and a pawl 32 pivoted to the cap and pressed outwardly by a spring 33 are adapted to hold the cap against reverse rotation to prevent the motor-springs from unwinding.

The motor drives the generator thru multiplying gearing which comprises an internally toothed gear 34 secured to rotate with the last drum 30, a pinion 35 meshing with the gear 34 and connected by a shaft 37 to drive a gear 36, a pinion 38 driven by pinion 36 and connected by a shaft 39 to drive a gear 40, a pinion 41 driven by gear 40 and connected to drive a gear 42 by a shaft 43, a pinion 44 on a shaft 45 which drives a gear 46, a pinion 47 on a shaft 48 which drives a gear 49 and a pinion 50 which is loose on the stationary shaft 18. Pinion 50 drives the rotary field thru a pawl 51 on said field and a ratchet 52 on said pinion, so that when the gearing is arrested, the field will be free to run down, without jerking the gearing. Shafts 37, 39, 43, 45 and 48 are journaled in the head 27.

The operation of the generator and the lamp are controlled by a brake-shoe 54 which is operable by a button 55 on the outside of the case and is slidable into and out of engagement with the conoidal periphery of gear 34. This shoe may also, if desired, be used to apply sufficient friction to gear 34 to check the speed of the generator. Vanes 56 on the rotary field may be used to check the speed of the generator and prevent the motor from running down faster than necessary.

In use, the motor is wound up by grasping the body of the case in one hand and the cap 26 in the other, and then rotating one relatively to the other. When the controller brake 54 is released, the motor will drive the generator and the current generated thereby will actuate the incandescent lamp 11. When the brake is shifted to stop the gear 34, the motor will stop and the actuation of the lamp will be discontinued.

The invention exemplifies a portable lamp in which a generator is driven by a mechanical motor in which power is stored by manual winding, which dispenses with a battery, and which may be indefinitely used; it being only necessary to wind up the motor.

The invention is not to be understood as limited to the details set forth and may be modified within the scope of the appended claims, without departing from the spirit and scope of the invention.

We claim:

1. In a portable lamp, the combination of a case, a generator in said case, an electric lamp connected to be actuated by current from said generator, a mechanical motor for driving said generator, and a stationary shaft disposed in the case and on which the generator and mechanical motor are mounted.

2. In a portable lamp, the combination of a case, a generator in said case, an electric lamp connected to be actuated by current from said generator, a mechanical motor for driving said generator, a head secured to said case, and a shaft fixedly secured in said head and on which the generator and mechanical motor are mounted.

3. In a portable lamp, the combination of a case, a generator in said case, an electric lamp connected to be actuated by current from said generator, a mechanical motor for driving said generator, a head secured to said case and disposed between the generator and mechanical motor, a shaft fixedly secured in said head and on which the generator and mechanical motor are mounted.

4. In a portable lamp, the combination of a case, a generator in said case, an electric lamp connected to be actuated by current from said generator, a spring motor for driving the generator, a stationary shaft disposed in the case and on which the generator and spring motor are mounted, and multiplying gearing between the motor and generator.

5. In a portable lamp, the combination of a case comprising members rotatable relatively to one another, a generator, an electric lamp connected to be actuated by current from said generator, a spring motor for operating the generator, a stationary shaft secured in said casing on which the generator and spring motor are mounted, a connection between the motor and one member of the case whereby the motor may be wound by rotation of said member, and means between the two rotatable members to hold them against reverse rotation.

6. In a portable lamp, the combination of a case comprising members rotatable relatively to one another, a generator, an electric lamp connected to be actuated by current from said generator, a spring motor for operating the generator, a stationary shaft secured in said casing on which the generator and spring motor are mounted, a connection betwen the motor and one member of the case whereby the motor may be wound by rotation of said member, and a pawl and ratchet connection on and between the two rotatable members to hold them against reverse rotation.

7. In a portable lamp, the combination of a substantially cylindrical case, a cap adapted to close one end of and rotatable relatively to said case, a generator, an electric lamp connected to be actuated by current from said generator, a stationary shaft secured in said casing on which the generator and spring motor are mounted, a spring motor for operating the generator, a connection between the motor and the cap whereby the motor may be wound by rotation of the cap, and means between the cap and the casing to prevent reverse rotation.

8. In a portable lamp, the combination of a case, a generator in said case, an electric lamp connected to be actuated by current from said generator, a mechanical motor for driving the generator, a stationary shaft disposed in the case and on which the generator and motor is mounted, multiplying gearing between the motor and generator, and a pawl and ratchet connection between said multiplying gearing and the generator.

9. In a portable lamp, the combination of a case, a generator in said case, an electric lamp connected to be actuated by current from said generator, a mechanical motor, a stationary shaft disposed in the case and on which the generator and motor is mounted, multiplying gearing operated by said motor and adapted to operate a pinion which is loosely mounted on said shaft, a pawl and ratchet connection operated by said pinion and adapted to operate the generator.

10. In a portable lamp, the combination of a case, a generator in said case, an electric lamp connected to be actuated by current from said generator, a mechanical motor for driving said generator, a stationary shaft disposed in the casing and on which the generator and mechanical motor are mounted, and means to control the operation of said motor.

11. In a portable lamp, the combination of a case, a head secured in said case, a stationary shaft fixedly mounted in said head, a generator comprising an armature rigidly secured to one end of said shaft and a magnetic field rotatably mounted on said shaft and adapted to rotate about the armature, an electric lamp connected to be actuated by current from said generator, and a spring motor rotatably mounted about the other end of said shaft to operate said generator.

12. In a portable lamp, the combination of a case, a head secured in said case, a stationary shaft mounted in said head, a generator comprising a stationary armature fixed to one end of said shaft, and a magnetic field rotatably mounted on the shaft and adapted to rotate about said armature, an electric lamp connected to be actuated by current from said generator, a mechanical motor for operating said generator comprising a plurality of convolute springs and intermediate drums serially connected and rotatably mounted on the other end of said shaft, and multiplying gearing between the generator and spring motor.

13. In a portable lamp, the combination of a case, a head secured in said case, a stationary shaft fixedly secured in said head, a generator mounted on one end of said shaft, a spring motor for driving the generator mounted on the other end of said shaft, the head being disposed between the motor and the generator, and multiplying gearing between the motor and the generator rotatably mounted in said head.

14. In a portable lamp, the combination of a case, a generator in said case, an electric lamp connected to be actuated by current from said generator, a spring motor, a stationary shaft disposed in the casing and on which the generator and motor are mounted, multiplying gearing adapted to be driven by said motor, and a pawl and ratchet connection between said gearing and generator.

JOHN HOLL.
GALLUS E. BOETTCHER.